(12) United States Patent
Chen et al.

(10) Patent No.: US 11,165,165 B2
(45) Date of Patent: Nov. 2, 2021

(54) ANTENNA SYSTEM, BASE STATION, AND COMMUNICATIONS SYSTEM

(71) Applicant: HUAWEI TECHNOLOGIES CO., LTD., Guangdong (CN)

(72) Inventors: Wei Chen, Shanghai (CN); Xiaojun Zheng, Shanghai (CN); Bin Xiong, Shanghai (CN); Tao Jin, Shanghai (CN); Shuai Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 19 days.

(21) Appl. No.: 16/728,481

(22) Filed: Dec. 27, 2019

(65) Prior Publication Data

US 2020/0136266 A1    Apr. 30, 2020

Related U.S. Application Data

(63) Continuation of application No. PCT/CN2017/091097, filed on Jun. 30, 2017.

(51) Int. Cl.
*H01Q 21/00* (2006.01)
*H01Q 1/24* (2006.01)
*H01Q 21/30* (2006.01)

(52) U.S. Cl.
CPC ......... *H01Q 21/0006* (2013.01); *H01Q 1/246* (2013.01); *H01Q 21/30* (2013.01)

(58) Field of Classification Search
CPC ...... H01Q 21/0006; H01Q 21/30; H01Q 1/24; H01Q 1/246; H01Q 5/00; H01Q 5/20; H01Q 5/30; H01Q 5/307; H01Q 5/35
See application file for complete search history.

(56) References Cited

U.S. PATENT DOCUMENTS

| | | | | |
|---|---|---|---|---|
| 5,132,694 A | * | 7/1992 | Sreenivas | H04B 7/18515 342/373 |
| 6,043,790 A | * | 3/2000 | Derneryd | H01Q 3/26 342/368 |
| 2007/0205955 A1 | * | 9/2007 | Korisch | H01Q 3/267 343/853 |
| 2007/0243832 A1 | | 10/2007 | Park et al. | |
| 2008/0107093 A1 | | 5/2008 | Meiyappan et al. | |

(Continued)

FOREIGN PATENT DOCUMENTS

| | | |
|---|---|---|
| CN | 1787390 A | 6/2006 |
| CN | 102544753 A | 7/2012 |

(Continued)

*Primary Examiner* — Jason Crawford
(74) *Attorney, Agent, or Firm* — Womble Bond Dickinson (US) LLP

(57) ABSTRACT

An antenna system, including an antenna element, a feeding network, and a radio frequency module, where the radio frequency module includes m transmitters and n receivers, the m transmitters and the n receivers are separately connected to the feeding network, and a set of then frequency bands is a subset of a set of the m frequency bands; and the feeding network is further connected to the antenna element, feeds transmit signals generated by the m transmitters to the antenna element, and/or feeds receive signals of the antenna element to the n receivers, where m and n are positive integers, and n is less than m.

20 Claims, 5 Drawing Sheets

(56) References Cited

U.S. PATENT DOCUMENTS

| | | | |
|---|---|---|---|
| 2014/0242930 A1* | 8/2014 | Barker | H01Q 21/08 455/129 |
| 2015/0003436 A1 | 1/2015 | Shapira | |
| 2016/0049995 A1* | 2/2016 | Andre | H04B 7/04 370/277 |

FOREIGN PATENT DOCUMENTS

| | | |
|---|---|---|
| CN | 102570027 A | 7/2012 |
| CN | 104467901 A | 3/2015 |
| CN | 105101477 A | 11/2015 |
| CN | 105322283 A | 2/2016 |
| CN | 107860391 A | 3/2018 |
| KR | 100606024 B1 | 7/2006 |
| WO | 2014137203 A2 | 9/2014 |

* cited by examiner

ANTENNA SYSTEM, BASE STATION, AND COMMUNICATIONS SYSTEM

CROSS-REFERENCE TO RELATED APPLICATIONS

This application is a continuation of International Application No. PCT/CN2017/091097, filed on Jun. 30, 2017, the disclosure of which is hereby incorporated by reference in its entirety.

TECHNICAL FIELD

This application relates to the communications field, and more specifically, to an antenna system, a base station, and a communications system in the communications field.

BACKGROUND

As a requirement for wireless broadband increases, performance of a wireless network needs to be continuously improved. Use of an active antenna system can obtain a high-gain beam and a high user reuse rate, and improve a diversity gain on a plurality of channels, thereby obtaining a high-performance wireless network. As users have an increasingly high requirement for traffic volumes, more frequency bands are deployed in the active antenna system, and in the future, sites are evolved into frequency bands 6 to 9. However, operators have a very low probability of increasing a quantity of antennas. Therefore, a design of the antenna needs to be simplified, and this enables a wideband antenna module to become a trend. Being wideband herein may be understood as that a frequency band of a signal that is received or transmitted on the antenna may include a plurality of single frequency bands. In addition, with evolution of a multi-antenna technology, use of a large array antenna becomes an important means for improving spectral efficiency.

However, an active module of an existing antenna system supports reception and transmission of signals in various frequency bands at the same time, and consequently, a volume, a weight, and costs of a wideband large array antenna system all greatly increase. In addition, it is difficult for an existing manufacturing process level to implement a large array antenna that performs reception and transmission both in a plurality of frequency bands.

SUMMARY

This application provides an antenna system that has a receiving and transmitting capability of a signal in an asymmetric frequency band, to reduce a volume, a weight, and costs of the antenna system.

According to a first aspect, an antenna system is provided. The antenna system includes an antenna element, a feeding network, and a radio frequency module.

The radio frequency module includes m transmitters and n receivers, and the m transmitters and the n receivers are separately connected to the feeding network. The m transmitters respectively operate in m frequency bands, the n receivers respectively operate in n frequency bands, and a set of the n frequency bands is a subset of a set of the m frequency bands.

The feeding network is further connected to the antenna element, feeds transmit signals generated by the m transmitters to the antenna element, and/or feeds receive signals of the antenna element to the n receivers.

Where m and n are positive integers, and n is less than m.

When both reception and transmission are performed in a wide frequency band, volume costs and an indicator are difficult to meet. Therefore, the antenna system in this embodiment of this application transmits a signal in a relatively wide frequency band, and receives a signal only in a relatively narrow frequency band, that is, may transmit signals in m-frequency bands in downlink, and may receive signals in n-frequency bands in uplink. The n-frequency bands belong to a subset of the in-frequency bands. Therefore, a quantity of receive channels can be reduced, thereby reducing complexity of the receiver, and reducing complexity, power consumption, and production costs of the antenna system.

In addition, because of asymmetry of uplink and downlink service requirements of a base station, in this embodiment of this application, a quantity of channels in n receive frequency bands may be reduced, to further reduce antenna system costs.

In some embodiments, n=1, and m≥2.

In other words, in the active antenna system in this embodiment of this application, the transmitter may perform transmission in a plurality of frequency bands, and the receiver may perform reception in a single frequency band, in other words, the transmitter transmits signals in a plurality of frequency bands, and the receiver receives signals in a single frequency band. Compared with a symmetric multi-band antenna system in the prior art, in this embodiment, receiving processing is performed only on a single-band signal, so that a quantity of receive channels in the radio frequency module is further reduced, thereby reducing complexity, power consumption, and production costs of the antenna system.

In some embodiments, at least one passive port is disposed on the feeding network, and the passive port is configured to connect to an external receiver and/or an external transmitter. Frequency bands in which the external receiver operates are different from the n frequency bands, and frequency bands in which the external transmitter operates are different from the m frequency bands.

The feeding network is further configured to feed a signal generated by the external transmitter to the antenna element, and/or feed the receive signal of the antenna element to the external receiver.

In this case, the antenna system in this embodiment of this application can be compatible with an inventory antenna of a live network, implement, by using the inventory antenna of the live network, reception and transmission of a signal in a frequency band that is not covered by the antenna system, implement extension of a receiving and transmitting capability of the antenna system, and implement reuse of an inventory device of the live network.

In some embodiments, a set of the frequency bands in which the external receiver operates is a subset of the set of the m frequency bands.

In other words, in an uplink direction, a signal in a frequency band, other than a signal in a frequency band in which the receiver can perform reception, may be received by using the inventory antenna of the live network, in other words, a signal in a frequency band, other than a signal in a frequency band in which the receiver can perform reception, may be received and processed by the external receiver.

In some embodiments, the radio frequency module further includes a duplexer. The duplexer includes m transmit filters that are in a one-to-one correspondence with the m frequency bands, and each of the m transmit filters is configured to select a transmit signal in a frequency band corresponding to the transmit filter to pass through.

The duplexer further includes n receive filters that are in a one-to-one correspondence with the n frequency bands, and each of the n receive filters is configured to select a receive signal in a frequency band corresponding to the receive filter to pass through.

When a communications system to which the antenna system is applicable is a time division duplex system, the m transmit filters and the n receive filters in the duplexer perform, based on slot configuration of the mobile communications system, switching between uplink filtering and downlink filtering.

In the antenna system, as a quantity of antennas increases, duplexers also increase, and consequently, a volume, a weight, and costs of the antenna system greatly increase. However, in the asymmetric antenna system in this embodiment of this application, a structure of the duplexer can be further simplified by reducing receive radio frequency channels in the antenna system, thereby reducing complexity, power consumption, and production costs of the antenna system.

In another embodiment, the duplexer is further configured to isolate m transmit signals generated by the m transmitters. Further, the duplexer is further configured to isolate n receive signals received by the antenna element. In addition, when n=1, the duplexer does not need to isolate the receive signals.

In some embodiments, a transmit channel in the radio frequency module further includes a combiner, where the combiner is configured to combine the transmit signals generated by the m transmitters into one channel of transmit signals.

In some embodiments, the transmit channel in the radio frequency module further includes a wideband amplifier, where the wideband amplifier is connected to the combiner, and the wideband amplifier is configured to perform power amplification on the channel of transmit signals output by the combiner.

In some embodiments, a receive channel in the radio frequency module further includes a low noise amplifier, where the low noise amplifier is configured to perform low noise power amplification on a receive signal.

According to a second aspect, an embodiment of this application provides a base station. The base station includes the antenna system in the first aspect or any embodiment of the first aspect.

According to a third aspect, an embodiment of this application provides a communications system. The communications system includes the base station according to the second aspect.

DESCRIPTION OF EMBODIMENTS

The following describes technical solutions of this application with reference to accompanying drawings.

Figure 1:
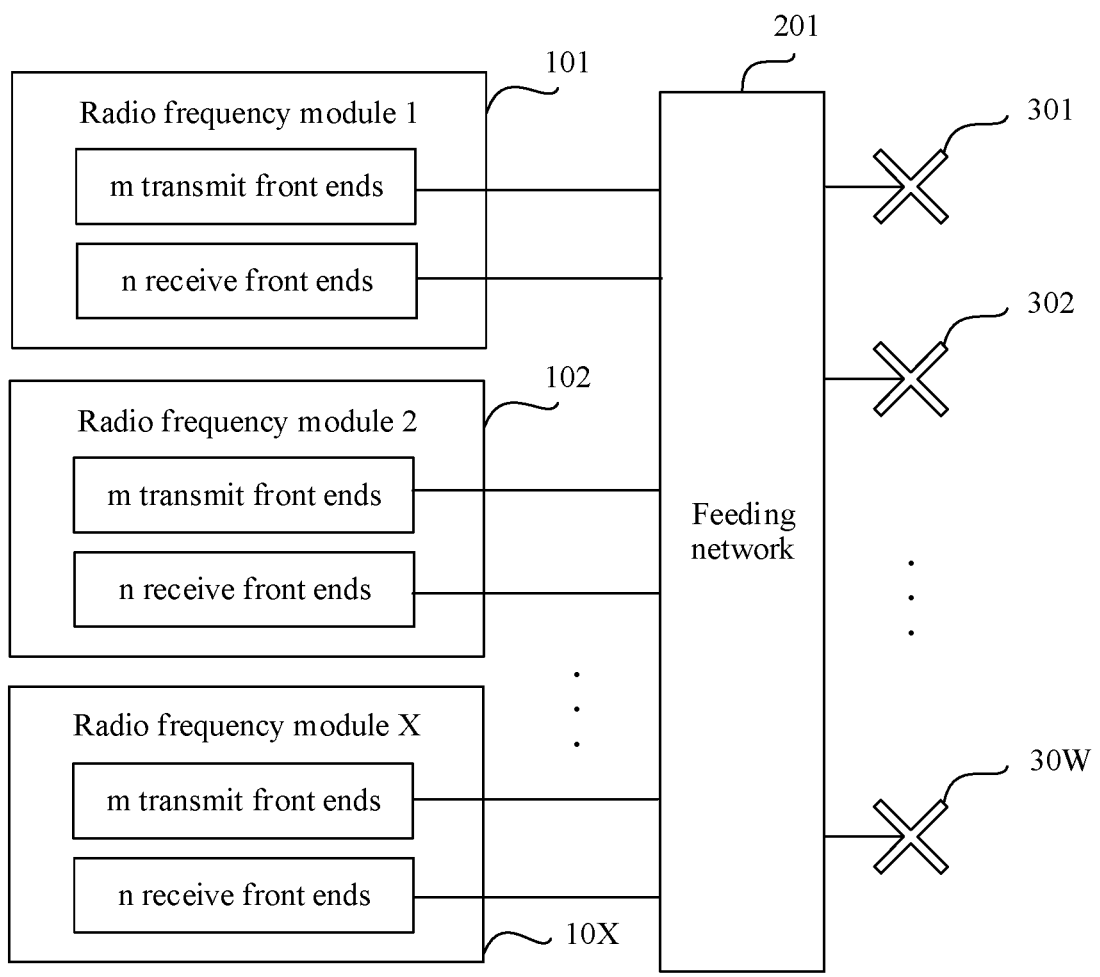
FIG. 1 is a schematic block diagram of an antenna system according to an embodiment of this application.

FIG. 1 is a schematic block diagram of an antenna system according to an embodiment of this application. The antenna system is an active antenna system, and may also be referred to as an active antenna array, a smart antenna, or the like. The antenna system includes a radio frequency module, a feeding network 201, and an antenna element. Specifically, a quantity of radio frequency modules may be X, and the X radio frequency modules may be a radio frequency module 1 101, a radio frequency module 2 102, . . . , and a radio frequency module X 10x. A quantity of antenna elements may be W, and the W antenna elements are an antenna element 301, an antenna element 302, . . . , and an antenna element 30W. Each antenna element has a corresponding radio frequency module. The antenna element is generally in a form of a panel.

Herein, W and X are positive integers. In addition, signals on one radio frequency module may be fed to one or more antenna elements. Therefore, one radio frequency module may correspond to one or more antenna elements. In this embodiment of this application, a transmitter and a receiver may share an antenna element, that is, the transmitter and the receiver may transmit or receive a radio frequency signal by using a same antenna element. Alternatively, the transmitter and the receiver do not share an antenna element. Specifically, an antenna element or a group of antenna elements is only configured to receive a radio frequency signal or is only configured to transmit a radio frequency signal.

Each of the X radio frequency modules includes m transmitters and n receivers (m and n are positive integers). The m transmitters and the n receivers are separately connected to the feeding network 201. The m transmitters respectively operate in m different frequency bands (m-frequency bands), and the n receivers respectively operate in n different frequency bands (n-frequency bands). A set of the n frequency bands is a subset of a set of the m frequency bands, and m is greater than n. In other words, in this embodiment of this application, a range of frequency bands that are supported by the transmitter includes and is greater than a range of frequency bands that are supported by the receiver.

The feeding network 201 is connected to the W antenna elements, feeds transmit signals generated by the m transmitters to each antenna element, and/or feeds receive signals of each antenna element to the n receivers.

The antenna system in this embodiment of this application may support transmission of signals in the m-frequency bands, and reception of signals in the n-frequency bands. The antenna system may be applied to a base station supporting one or more mobile communications systems. Generally, different mobile communications systems have different frequency bands, and one mobile communications system may have at least one frequency band. The mobile communications system in this embodiment of this application is, for example, a global system for mobile communications (GSM) system, a code division multiple access (CDMA) system, a wideband code division multiple access (WCDMA) system, general packet radio service (GPRS) system, a long term evolution (LTE) system, an advanced long term evolution (LTE-A) system, a universal mobile communications system (UMTS), or a next generation communications system, such as a 5G system.

Herein, each transmitter has a transmit channel, and the transmit channel includes a digital to analog converter (DAC), a frequency up-converter, and a power amplifier. Each receiver has a receive channel, and the receive channel includes a low noise amplifier, a frequency down-converter, and an analog to digital converter (ADC). In this embodiment of this application, it may be understood that the transmitter includes a transmit channel, and has a radio frequency unit that has an appropriate transmit component, and it may be understood that the receiver includes a receive channel, and has a radio frequency unit that has an appropriate receive component.

When both reception and transmission are performed in a wide frequency band, volume costs and an indicator are difficult to meet. Therefore, the antenna system in this embodiment of this application transmits a signal in a relatively wide frequency band, and receives a signal only in a relatively narrow frequency band, that is, may transmit signals in m-frequency bands in downlink, and may receive signals in n-frequency bands in uplink. The n-frequency bands belong to a subset of the in-frequency bands. Therefore, a quantity of receive channels can be reduced, thereby reducing complexity of the receiver, and reducing complexity, power consumption, and production costs of the antenna system.

In another embodiment, the quantity of receivers n=1, and the quantity of transmitters m≥2.

Figure 2:
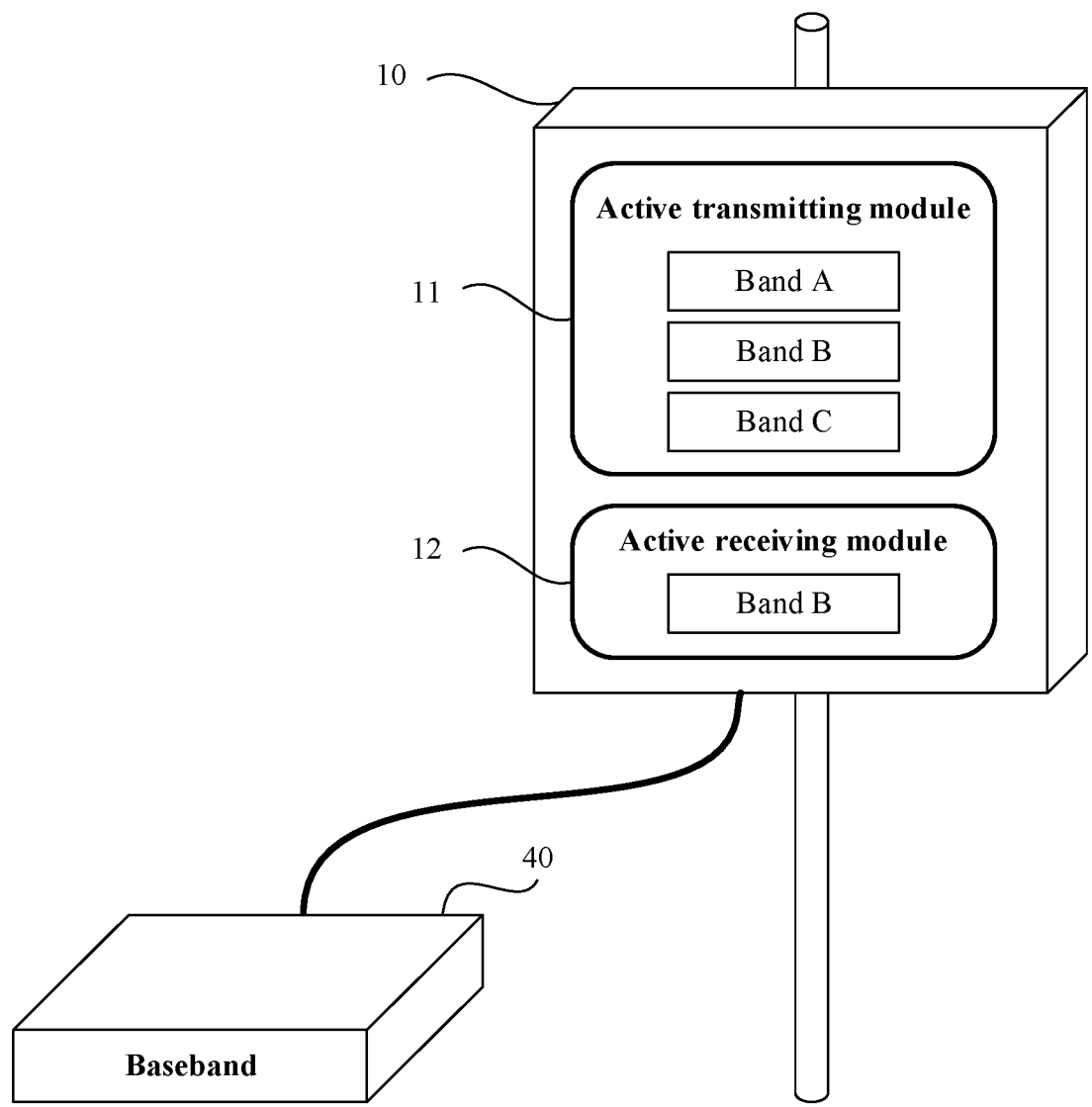
FIG. 2 is a schematic architectural diagram of an antenna system according to an embodiment of this application.

In other words, in the active antenna system in this embodiment of this application, the transmitter may perform transmission in a plurality of frequency bands, and the receiver may perform reception in a single frequency band, in other words, the transmitter transmits signals in a plurality of frequency bands, and the receiver receives signals in a single frequency band. FIG. 2 is a schematic architectural diagram of an antenna system according to an embodiment of this application. In FIG. 2, a radio frequency module 10 is connected to a baseband 40, and the radio frequency module 10 includes an active transmitting module 11 and an active receive module 12. The active transmitting module 11 includes three transmitters that respectively operate in a frequency band A, a frequency band B, and a frequency band C. The active receive module 12 includes a receiver that operates in the frequency band B.

Figure 3:
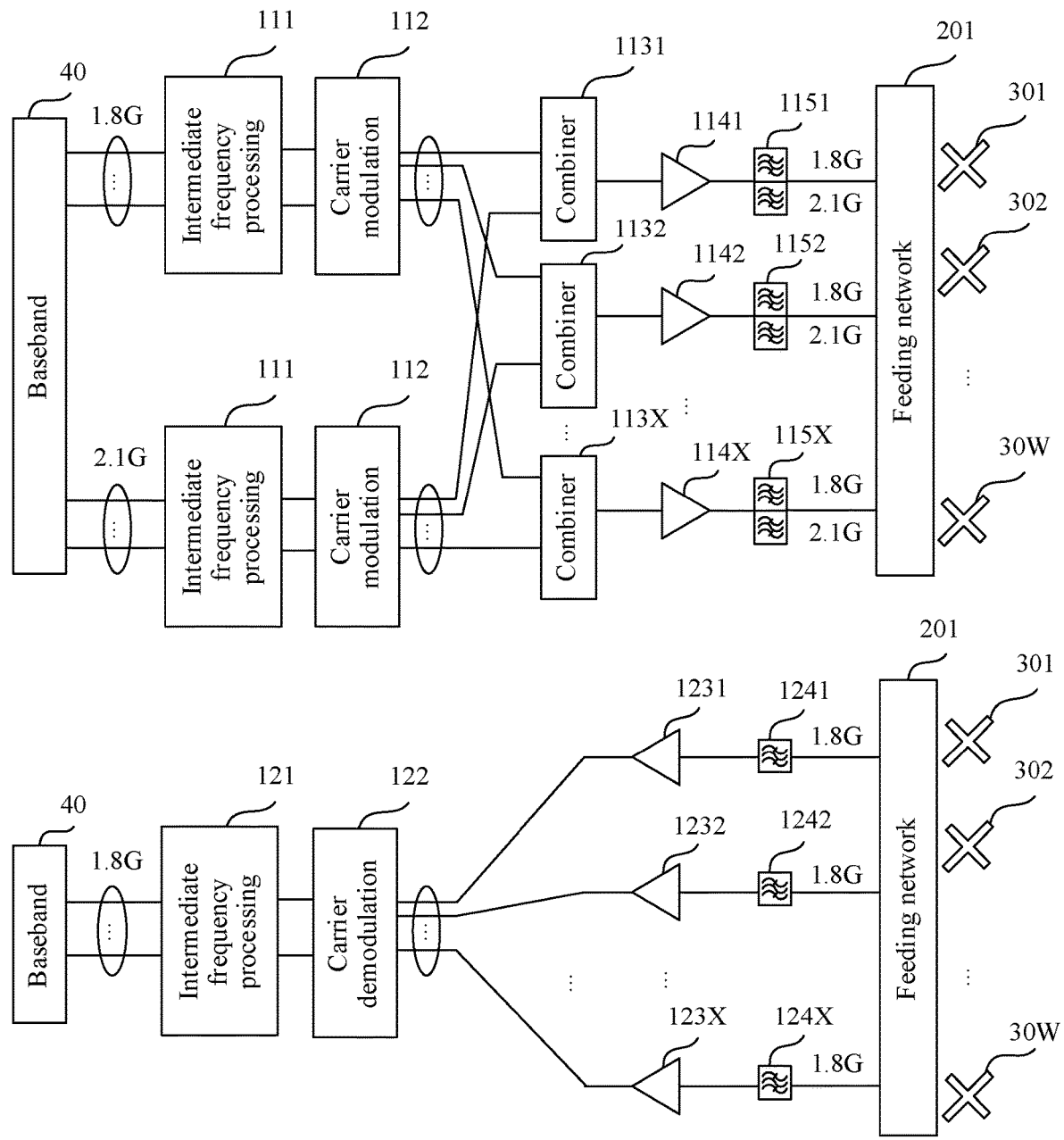
FIG. 3 is a schematic structural diagram of an antenna system according to an embodiment of this application.

FIG. 3 is a schematic structural diagram of an antenna system according to an embodiment of this application. In FIG. 3, a part same as or similar to that in FIG. 1 or FIG. 2 is represented by a same reference numeral. In the antenna system shown in FIG. 3, a transmitter may simultaneously support transmission of signals in a 1.8 GHz frequency band and a 2.1 GHz frequency band, while a receiver supports only reception of signals in the 1.8 GHz frequency band. Herein, the 1.8 GHz frequency band and the 2.1 GHz frequency band may be two frequency bands in a same mobile communications system, and the mobile communications system supports multi-user access. The baseband 40 may separately generate a plurality of channels of transmit signals in the 1.8 GHz frequency band and the 2.1 GHz frequency band, and process a plurality of channels of receive signals in the 1.8 GHz single frequency band. For example, the transmit signals and the receive signals may separately include 32 channels. In the antenna system, a transmit channel includes intermediate frequency processing 111 and carrier modulation 112, and a receive channel includes carrier demodulation 122 and intermediate frequency processing 121.

In addition, because of asymmetry of uplink and downlink service requirements of a base station, in this embodiment of this application, a quantity of channels in n receive frequency bands may be reduced, to further reduce antenna system costs. For example, the 32 channels of receive signals may be reduced to 16 channels or 8 channels.

In another embodiment, the transmit channel in the radio frequency module further includes a combiner. The combiner is configured to combine the transmit signals generated by the m transmitters into one channel of transmit signals. The transmit channel in the radio frequency module may further include a wideband amplifier. The wideband amplifier is configured to perform power amplification on the transmit signals. Specifically, the wideband amplifier may be connected to the combiner, and perform power amplification on the channel of transmit signals output by the combiner.

FIG. 3 has X combiners in total: a combiner 1131, a combiner 1132, . . . , and a combiner 113X. A quantity of X is related to a quantity of transmit signals. For example, when there are 32 channels of transmit signals, the quantity of combiners X is 32. Each combiner is connected to a wideband amplifier. For example, the combiner 1131 is connected to a wideband amplifier 1141, the combiner 1132 is connected to a wideband amplifier 1142, and the combiner 113X is connected to a wideband amplifier 114X. One channel of transmit signals in each frequency band is input into each combiner, and the combiner combines a plurality of channels of transmit signals into one channel of transmit signals, and outputs the channel of transmit signals to a wideband amplifier connected to the combiner. For example, each combiner 1131 may combine one channel of transmit signals in 1.8 GHz and one channel of transmit signals in 2.1 GHz into one channel of transmit signals, and output, to the wideband amplifier 1141, the channel of output signals that is obtained by combination. The wideband amplifier performs power amplification on the transmit signals output by the combiner.

In this embodiment of this application, the receive channel in the radio frequency module further includes a low noise amplifier. Specifically, there are X low noise amplifiers LNAs in FIG. 3: an LNA 1231, an LNA 1232, . . . , and an LNA 123X. The LNA is configured to perform low noise power amplification on receive signals.

Therefore, compared with a symmetric multiband antenna system in the prior art, in this embodiment, receiving processing is performed only on a single-band signal, so that a quantity of receive channels in the radio frequency module is further reduced, thereby reducing complexity, power consumption, and production costs of the antenna system.

In this embodiment of this application, the radio frequency module further includes a duplexer. Specifically, the antenna system shown in FIG. 3 includes X duplexers. Each duplexer is connected to a wideband amplifier, and is connected to an LNA. The wideband amplifier is configured to output a transmit signal to the duplexer, and the LNA is configured to receive a receive signal output by the duplexer. For example, the wideband amplifier 1141 and the LNA 1231 are separately connected to a duplexer 1151, the wideband amplifier 1142 and the LNA 1232 are separately connected to a duplexer 1152, and the wideband amplifier 114X and the LNA 123X are separately connected to a duplexer 115X.

In another embodiment, the duplexer includes m transmit filters that are in a one-to-one correspondence with the m frequency bands, and each of the m transmit filters is configured to select a transmit signal in a frequency band corresponding to the transmit filter to pass through; and the duplexer includes n receive filters that are in a one-to-one correspondence with the n frequency bands, and each of the n receive filters is configured to select a receive signal in a frequency band corresponding to the receive filter to pass through. In this embodiment of this application, the filters in the duplexer meet requirements of radio frequency indicators of the transmitter and the receiver.

For example, in the antenna system shown in FIG. 3, each duplexer has a transmit filter that selects a transmit signal in the 2.1 GHz frequency band to pass through, a receive filter that selects a transmit signal in the 1.8 GHz frequency band to pass through, and a receive filter that selects a receive signal in the 1.8 GHz frequency band to pass through.

In an embodiment, when a mobile communications system to which the antenna system is applicable is a time division duplex system, the m transmit filters and the n receive filters in the duplexer perform, based on slot configuration of the mobile communications system, switching between uplink filtering and downlink filtering.

However, a symmetric multiband antenna system in the prior art has a filter that selects a transmit signal in each frequency band to pass through and a filter that selects a receive signal in each frequency band to pass through. Therefore, it is very difficult to design a duplexer that receives and transmits a signal in a plurality of frequency bands. In addition, in the antenna system, as a quantity of antennas increases, duplexers also increase, and consequently, a volume, a weight, and costs of the antenna system greatly increase. However, in the asymmetric antenna system in this embodiment of this application, receive radio frequency channels in the antenna system are reduced, a structure of the duplexer can be further simplified, thereby reducing complexity, power consumption, and production costs of the antenna system.

In another embodiment, the duplexer is further configured to isolate m transmit signals generated by the m transmitters. Further, when n is greater than 1, the duplexer is further configured to isolate n receive signals received by the antenna element. When n=1, the duplexer does not need to isolate the receive signals.

In this way, a structure of the duplexer can be further simplified by reducing receive radio frequency channels in the antenna system, thereby reducing complexity, power consumption, and production costs of the antenna system.

In another embodiment, at least one passive port is disposed on the feeding network, and the passive port is configured to connect to an external receiver and/or an external transmitter. Frequency bands in which the external receiver operates are different from the n frequency bands, and frequency bands in which the external transmitter operates are different from the m frequency bands. The feeding network is further configured to feed a signal generated by the external transmitter to each antenna element, and/or feed the receive signal of each antenna element to the external receiver.

Figure 4:
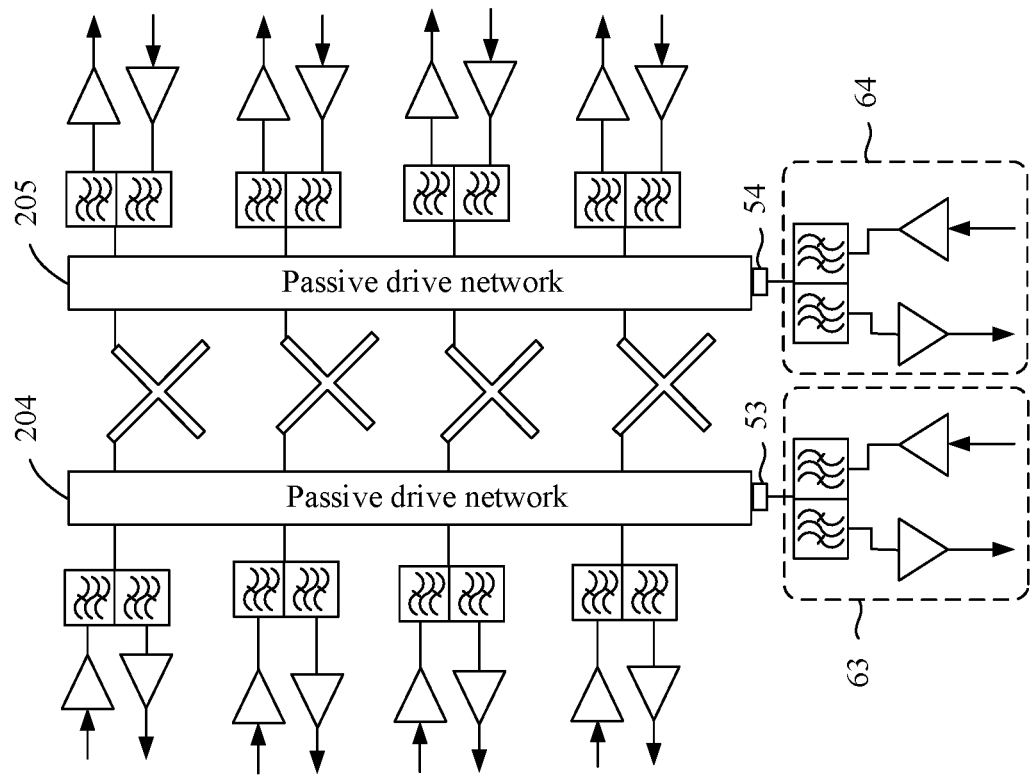
FIG. 4 is another schematic structural diagram of an antenna system according to an embodiment of this application.
Figure 4:
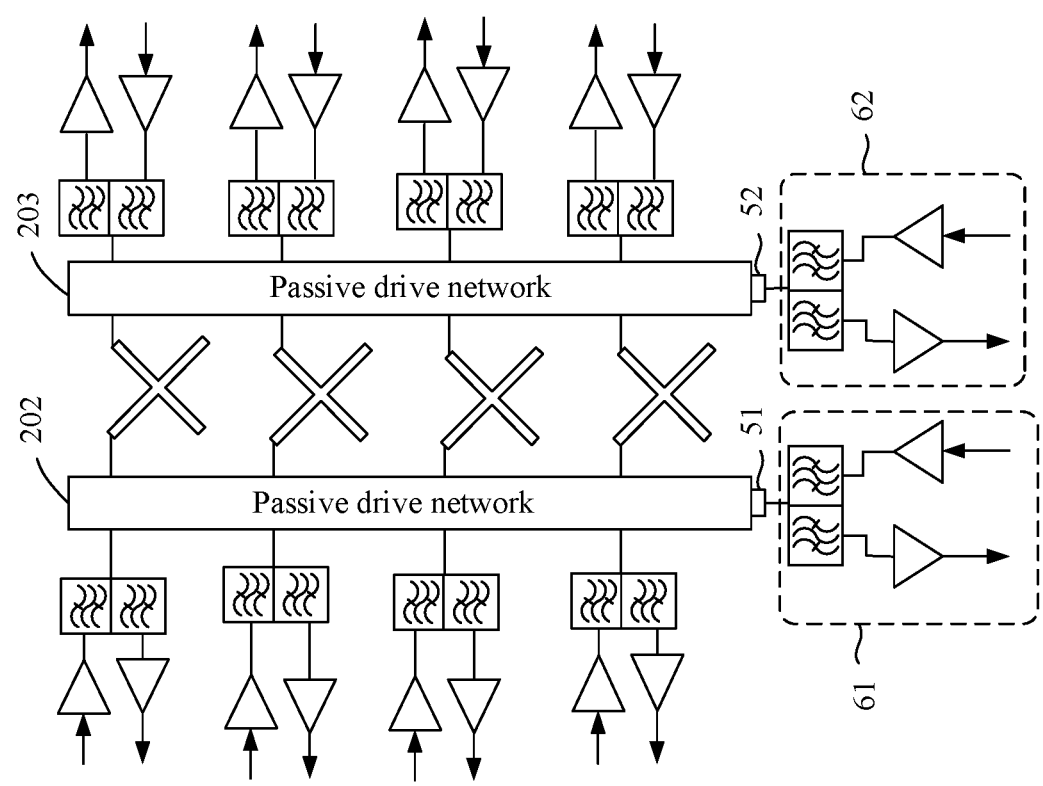

FIG. 4 is another structural diagram of an antenna system according to an embodiment of this application. In FIG. 4, passive drive networks 202, 203, 204, and 205 may be specific embodiments of the feeding network 201. The passive drive networks 202 and 203 share a group of antenna elements, and the passive drive networks 204 and 205 share a group of antenna elements. An active transmitting module that belongs to the antenna system and that is connected to the passive drive networks 202, 203, 204, and 205 supports transmission of signals in a plurality of frequency bands, and an active receiving module may support reception of signals in a single frequency band. In addition, the passive drive networks 202, 203, 204, and 205 respectively have passive ports 51, 52, 53, and 54. External transceivers 61, 62, 63, and 64 are respectively externally connected to the passive ports 51, 52, 53, and 54. The transceivers 61, 62, 63, and 64 can receive and transmit signals in frequency bands in which the antenna system cannot perform reception and transmission.

In this case, the antenna system in this embodiment of this application can be compatible with an inventory antenna of a live network, implement, by using the inventory antenna of the live network, reception and transmission of a signal in a frequency band that is not covered by the antenna system, implement extension of a receiving and transmitting capability of the antenna system, and implement reuse of an inventory device of the live network.

In another embodiment, a set of the frequency bands in which the external receiver operates may be a subset of the set of the m frequency bands.

In other words, in an uplink direction, a signal in a frequency band, other than a signal in a frequency band in which the receiver can perform reception, may be received by using the inventory antenna of the live network, in other words, a signal in a frequency band, other than a signal in a frequency band in which the receiver can perform reception, may be received and processed by the external receiver.

Figure 5:
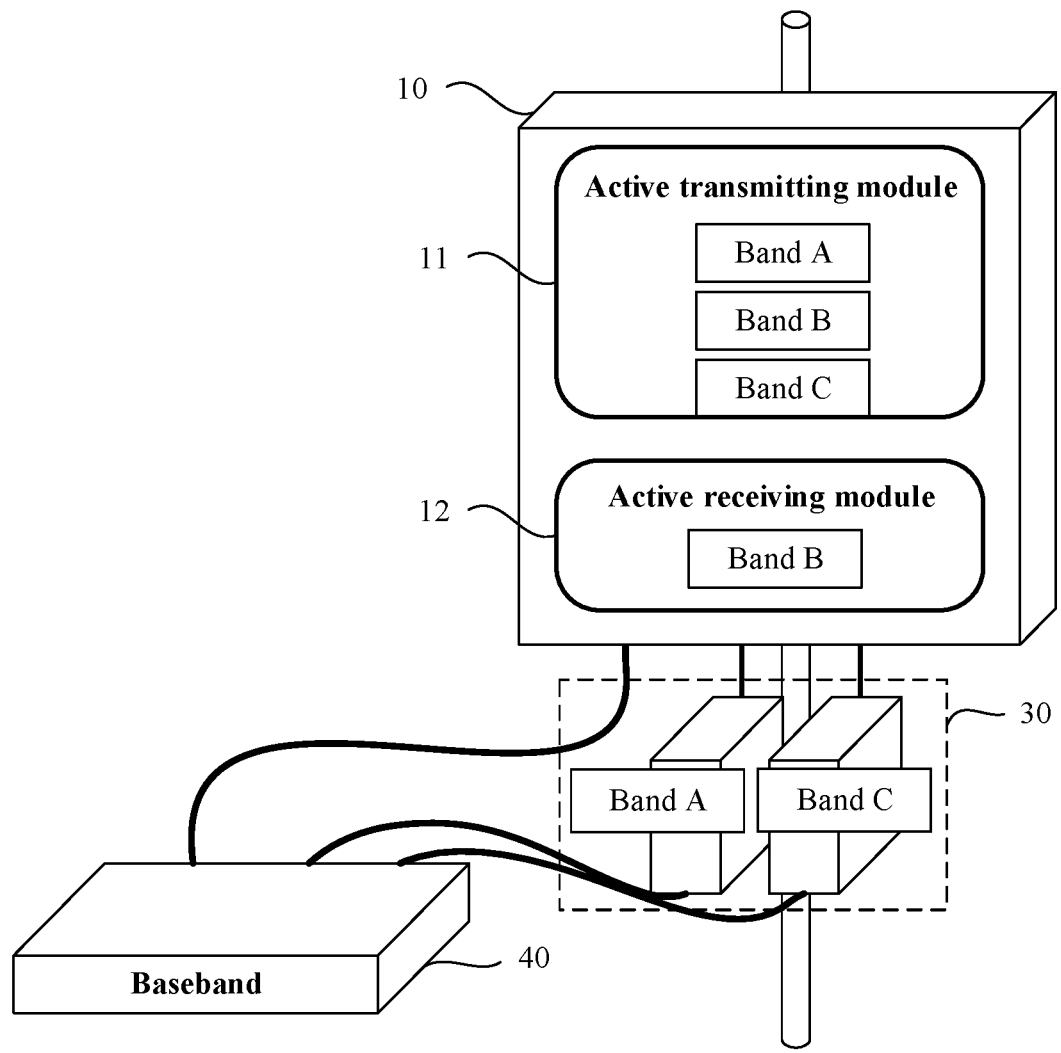
FIG. 5 is a schematic architectural diagram of an antenna system according to an embodiment of this application.

FIG. 5 is a schematic architectural diagram of an antenna system according to an embodiment of this application. In FIG. 5, a part same as or similar to that in FIG. 1 or FIG. 2 is represented by a same reference numeral. Compared with the antenna system architecture in FIG. 2, the antenna system architecture in FIG. 5 further includes an external receiver 30. Specifically, the external receiver 30 includes a receiver operating in a frequency band A and a receiver operating in a frequency band C. In addition, the receiver operating in the frequency band A and the receiver operating in the frequency band C are separately connected to the baseband 40. Specifically, the receiver 30 can receive signals in the frequency band A and the frequency band C, process the receive signals, and transmit the receive signals to the baseband 40. In other words, in the antenna system shown in FIG. 2, the receive signals in the frequency band A and the frequency band C may be received by using the inventory antenna of the live network.

An embodiment of this application further provides a base station. The base station includes the antenna system in the embodiments of this application, and the antenna system includes an antenna element, a feeding network, and a radio frequency module.

The radio frequency module includes m transmitters and n receivers, and the m transmitters and the n receivers are separately connected to the feeding network. The m transmitters respectively operate in m frequency bands, the n receivers respectively operate inn frequency bands, and a set of the n frequency bands is a subset of a set of the m frequency bands.

The feeding network is further connected to the antenna element, feeds transmit signals generated by the m transmitters to the antenna element, and/or feeds receive signals of the antenna element to the n receivers.

Herein, m and n are positive integers, and n is less than m.

When both reception and transmission are performed in a wide frequency band, volume costs and an indicator are difficult to meet. Therefore, the antenna system in this embodiment of this application transmits a signal in a relatively wide frequency band, and receives a signal in only a relatively narrow frequency band, that is, may transmit signals in m-frequency bands in downlink, and may receive signals in n-frequency bands in uplink. The n-frequency bands belong to a subset of the in-frequency bands. Therefore, a quantity of receive channels can be reduced, thereby reducing complexity of the receiver, and reducing complexity, power consumption, and production costs of the antenna system.

An embodiment of this application further provides a communications system. The communications system includes the base station in the embodiments of this application. The base station includes the antenna system in the embodiments of this application, and the antenna system includes an antenna element, a feeding network, and a radio frequency module.

The radio frequency module includes m transmitters and n receivers, and the m transmitters and the n receivers are separately connected to the feeding network. The m transmitters respectively operate in m frequency bands, the n receivers respectively operate inn frequency bands, and a set of the n frequency bands is a subset of a set of the m frequency bands.

The feeding network is further connected to the antenna element, feeds transmit signals generated by the m transmitters to the antenna element, and/or feeds receive signals of the antenna element to the n receivers.

Herein, m and n are positive integers, and n is less than m.

When both reception and transmission are performed in a wide frequency band, volume costs and an indicator are difficult to meet. Therefore, the antenna system in this embodiment of this application transmits a signal in a relatively wide frequency band, and receives a signal in only a relatively narrow frequency band, that is, may transmit signals in m-frequency bands in downlink, and may receive signals in n-frequency bands in uplink. The n-frequency bands belong to a subset of the in-frequency bands. Therefore, a quantity of receive channels can be reduced, thereby reducing complexity of the receiver, and reducing complexity, power consumption, and production costs of the antenna system.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should further be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use a different method for each particular application to implement the described functions, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna system, comprising an antenna element, a feeding network, and a radio frequency module, wherein
the radio frequency module comprises m transmitters and n receivers, and the m transmitters and the n receivers are separately connected to the feeding network, the m transmitters respectively operate in m frequency bands, the n receivers respectively operate in n frequency bands, and a set of the n frequency bands is a subset of a set of the m frequency bands; and the feeding network is further connected to the antenna element, feeds transmit signals generated by the m transmitters to the antenna element, and/or feeds receive signals of the antenna element to the n receivers, wherein m and n are positive integers, and n is less than m.

2. The antenna system according to claim 1, wherein n=1, and m≥2.

3. The antenna system according to claim 1, wherein at least one passive port is disposed on the feeding network, the passive port is configured to connect to an external receiver and/or an external transmitter, frequency bands in which the external receiver operates are different from the n frequency bands, and frequency bands in which the external transmitter operates are different from the m frequency bands; and the feeding network is further configured to feed a signal generated by the external transmitter to the antenna element, and/or feed the receive signal of the antenna element to the external receiver.

4. The antenna system according to claim 3, wherein a set of the frequency bands in which the external receiver operates is a subset of the set of the m frequency bands.

5. The antenna system according to claim 1, wherein the radio frequency module further comprises a duplexer, wherein the duplexer comprises m transmit filters that are in a one-to-one correspondence with the m frequency bands, and each of the m transmit filters is configured to select a transmit signal in a frequency band corresponding to the transmit filter to pass through; and the duplexer further comprises n receive filters that are in a one-to-one correspondence with the n frequency bands, and each of the n receive filters is configured to select a receive signal in a frequency band corresponding to the receive filter to pass through.

6. The antenna system according to claim 5, wherein when a communications system to which the antenna system is applicable is a time division duplex system, the m transmit filters and the n receive filters perform, based on slot configuration of the communications system, switching between uplink filtering and downlink filtering.

7. The antenna system according to claim 1, wherein the radio frequency module further comprises a combiner, wherein the combiner is configured to combine the transmit signals generated by the m transmitters into one channel of transmit signals.

8. The antenna system according to claim 7, wherein the radio frequency module further comprises a wideband amplifier, wherein the wideband amplifier is connected to the combiner, and the wideband amplifier is configured to perform power amplification on the channel of transmit signals output by the combiner.

9. A base station, comprising an antenna system, wherein the antenna system comprising an antenna element, a feeding network, and a radio frequency module, and wherein:

the radio frequency module comprises m transmitters and n receivers, and the m transmitters and the n receivers are separately connected to the feeding network, the m transmitters respectively operate in m frequency bands, the n receivers respectively operate in n frequency bands, and a set of the n frequency bands is a subset of a set of the m frequency bands; and the feeding network is further connected to the antenna element, feeds transmit signals generated by the m transmitters to the antenna element, and/or feeds receive signals of the antenna element to the n receivers, wherein m and n are positive integers, and n is less than m.

10. The base station according to claim 9, wherein n=1, and m≥2.

11. The base station according to claim 9, wherein at least one passive port is disposed on the feeding network, the passive port is configured to connect to an external receiver and/or an external transmitter, frequency bands in which the external receiver operates are different from the n frequency bands, and frequency bands in which the external transmitter operates are different from the m frequency bands; and the feeding network is further configured to feed a signal generated by the external transmitter to the antenna element, and/or feed the receive signal of the antenna element to the external receiver.

12. The base station according to claim 11, wherein a set of the frequency bands in which the external receiver operates is a subset of the set of the m frequency bands.

13. The base station according to claim 9, wherein the radio frequency module further comprises a duplexer, wherein the duplexer comprises m transmit filters that are in a one-to-one correspondence with the m frequency bands, and each of the m transmit filters is configured to select a transmit signal in a frequency band corresponding to the transmit filter to pass through; and the duplexer further comprises n receive filters that are in a one-to-one correspondence with the n frequency bands, and each of the n receive filters is configured to select a receive signal in a frequency band corresponding to the receive filter to pass through.

14. The base station according to claim 13, wherein when a communications system to which the antenna system is applicable is a time division duplex system, the m transmit filters and the n receive filters perform, based on slot configuration of the communications system, switching between uplink filtering and downlink filtering.

15. The base station according to claim 9, wherein the radio frequency module further comprises a combiner, wherein the combiner is configured to combine the transmit signals generated by the m transmitters into one channel of transmit signals.

16. The base station according to claim 15, wherein the radio frequency module further comprises a wideband amplifier, wherein the wideband amplifier is connected to the combiner, and the wideband amplifier is configured to perform power amplification on the channel of transmit signals output by the combiner.

17. A communications system, wherein the communications system comprising a base station, wherein the base station comprises an antenna system, and wherein the antenna system comprises an antenna element, a feeding network, and a radio frequency module, and wherein:

the radio frequency module comprises m transmitters and n receivers, and the m transmitters and the n receivers are separately connected to the feeding network, the m transmitters respectively operate in m frequency bands, the n receivers respectively operate in n frequency bands, and a set of the n frequency bands is a subset of a set of the m frequency bands; and the feeding network is further connected to the antenna element, feeds transmit signals generated by the m transmitters to the antenna element, and/or feeds receive signals of the antenna element to the n receivers, wherein m and n are positive integers, and n is less than m.

18. The communications system according to claim 17, wherein n=1, and m≥2.

19. The communications system according to claim 17, wherein at least one passive port is disposed on the feeding network, the passive port is configured to connect to an external receiver and/or an external transmitter, frequency bands in which the external receiver operates are different from the n frequency bands, and frequency bands in which the external transmitter operates are different from the m frequency bands; and the feeding network is further configured to feed a signal generated by the external transmitter to the antenna element, and/or feed the receive signal of the antenna element to the external receiver.

20. The communications system according to claim 19, wherein a set of the frequency bands in which the external receiver operates is a subset of the set of the m frequency bands.

* * * * *